United States Patent  Heronimus

(10) Patent No.: US 12,164,897 B2
(45) Date of Patent: Dec. 10, 2024

(54) DEPLOYING A PROGRAM FROM WITHIN AN ACTIVE CICS REGION

(71) Applicant: Imperva, Inc., San Mateo, CA (US)

(72) Inventor: Scott Heronimus, Austin, TX (US)

(73) Assignee: Imperva, Inc., San Mateo, CA (US)

( * ) Notice: Subject to any disclaimer, the term of this patent is extended or adjusted under 35 U.S.C. 154(b) by 187 days.

(21) Appl. No.: 18/081,633

(22) Filed: Dec. 14, 2022

(65) Prior Publication Data
US 2023/0214200 A1  Jul. 6, 2023

Related U.S. Application Data

(60) Provisional application No. 63/295,788, filed on Dec. 31, 2021.

(51) Int. Cl.
 *G06F 8/61* (2018.01)
 *G06F 9/54* (2006.01)

(52) U.S. Cl.
 CPC . *G06F 8/61* (2013.01); *G06F 9/54* (2013.01)

(58) Field of Classification Search
 CPC .................. G06F 8/61; G06F 9/54; G06F 8/60
 USPC ........................................................ 717/174
 See application file for complete search history.

(56) References Cited

U.S. PATENT DOCUMENTS

| 2009/0307685 | A1* | 12/2009 | Axnix ....................... G06F 8/60 717/174 |
| 2017/0153880 | A1* | 6/2017 | Chen ......................... G06F 8/60 |
| 2018/0285085 | A1* | 10/2018 | Songa ....................... G06F 8/71 |
| 2020/0401447 | A1* | 12/2020 | Xiao .................... G06F 9/44505 |

OTHER PUBLICATIONS

Tang et al, "Research of Mainframe CICS Application Integration Using CICS SCA", 2009, [Online], pp. 1274-1277, [Retrieved from internet on Jul. 31, 2024], <chrome-extension://efaidnbmnn-nibpcajpcglclefindmkaj/https://dl.acm.org/doi/pdf/10.1145/1655925.1656158> (Year: 2009).*

* cited by examiner

*Primary Examiner* — S. Sough
*Assistant Examiner* — Zengpu We

(57) ABSTRACT

Embodiments of the present disclosure relate to systems and methods for installing a program within a CICS region without an antecedent program. A CICS region where the program is to be installed may detect an initiating event, the CICS region executing logical units of work that each corresponds to a task of a host operating system (OS). The initiating event may generate a first logical unit of work to intercept service calls made by the CICS region. In response to the first logical unit of work intercepting a first service call, control of execution of the first service call may be transitioned from the host OS to a CICS execution API. The CICS execution API may issue one or more API calls related to installation of the program, wherein the CICS execution API executes the one or more API calls as if they are part of the first service call.

20 Claims, 5 Drawing Sheets

DEPLOYING A PROGRAM FROM WITHIN AN ACTIVE CICS REGION

CROSS-REFERENCE TO RELATED APPLICATIONS

This application claims the benefit of U.S. Provisional Application No. 63/295,788, filed Dec. 31, 2021 and entitled "DEPLOYING A PROGRAM FROM WITHIN AN ACTIVE CICS REGION," the disclosure of which is hereby incorporated by reference.

TECHNICAL FIELD

Aspects of the present disclosure relate to transaction processing layers of operating systems, and more particularly to deployment of programs within transaction processing layers.

BACKGROUND

Many operating systems include transaction processing and management layers that can separate particular kinds of applications (e.g., online applications) from others in the system and handle such applications themselves. For example, the z/OS® operating system includes a program called the customer information control system (CICS®) which provides a layer of function for managing transactions, while the operating system remains the final interface with the computer hardware. CICS is a transaction processing subsystem that provides services for users to run online applications by request, while numerous other users are simultaneously submitting requests to run the same applications, using the same files and programs. CICS manages the sharing of resources, integrity of data, and prioritization of execution, while providing a fast response to requests to run online applications.

An application is a collection of related programs that together perform a business operation, such as processing a product order or preparing a company payroll. Applications that are managed by CICS execute under CICS control, using CICS services and interfaces to access programs and files. CICS applications are traditionally run by submitting a transaction request which is a piece of processing initiated by a single request. Transaction requests may be made from an end user at a terminal, but might also be made from a web page, from a remote workstation program, from an application in another CICS system, or triggered automatically at a predefined time. When a CICS application accesses a terminal or any device, for example, the CICS application does not communicate directly with the terminal or device. Instead, the CICS application issues commands to communicate with CICS, which communicates with the needed access methods of the operating system. Finally, the access method communicates with the terminal or device.

A single transaction may comprise of one or more programs that, when run, carry out the processing needed. A transaction may be specified to CICS with a transaction resource definition which provides a name for the transaction type (a transaction identifier or TRANSID) and provides the CICS with information about the work to be done, such as what program to invoke first and what kind of authentication is required throughout the execution of the transaction. A transaction may be run by submitting its TRANSID to CICS. CICS uses the information recorded in the transaction definition to establish the correct execution environment, and start the first program.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

A z/OS operating system might have multiple copies of CICS running at one time, where each copy (hereinafter referred to as a "CICS region") starts as a separate z/OS address space. Although embodiments of the present disclosure are described with respect to the CICS transaction processing system and the z/OS operating system for example purposes, they are not limited in this way and may be implemented using any appropriate operating system and any appropriate transaction processing and management system.

CICS does not support a programmatic way to define & install new programs via its execution API (EXEC CICS API), without the use of an antecedent program. While this requirement facilitates manual change-control, it also prevents automated program deployment. Although CICS supports dynamic program definition via resource definition online (RDO) transactions, these transactions are issued by authorized administrators to tailor the CICS region definition file to install various programs including global user exits (GLUEs) and task related user exits (TRUES). Additionally, the program objects must be made available to the CICS region via private library concatenation, either by copying the program object(s) into an existing program library or modifying the CICS region job control language (JCL) to include a new program library. This definition and installation rubric is problematic because it requires human intervention that can be untimely and error prone and can result in changing of the CICS region JCL and subsequent outage for the cycling of the CICS. This outage means the loss of business-critical applications for a non-trivial amount of time resulting in interruption of business activity.

The present disclosure addresses the above-noted and other deficiencies by providing techniques for installing a program within a CICS region without an antecedent program. An initiating event may be detected, the initiating event indicating that a CICS region is to intercept and execute API calls made to install a data protection program in the CICS region. A set of logical units of work to intercept service calls made by the CICS region may be generated and generation of a first service call may be triggered. In response to intercepting the first service call, control of execution of the first service call may be transitioned from the host operating system to the CICS region. API calls related to installation of the data protection program may be provided to the CICS region so that the CICS region executes the API calls as if they are a part of the first service call.

Figure 1A:
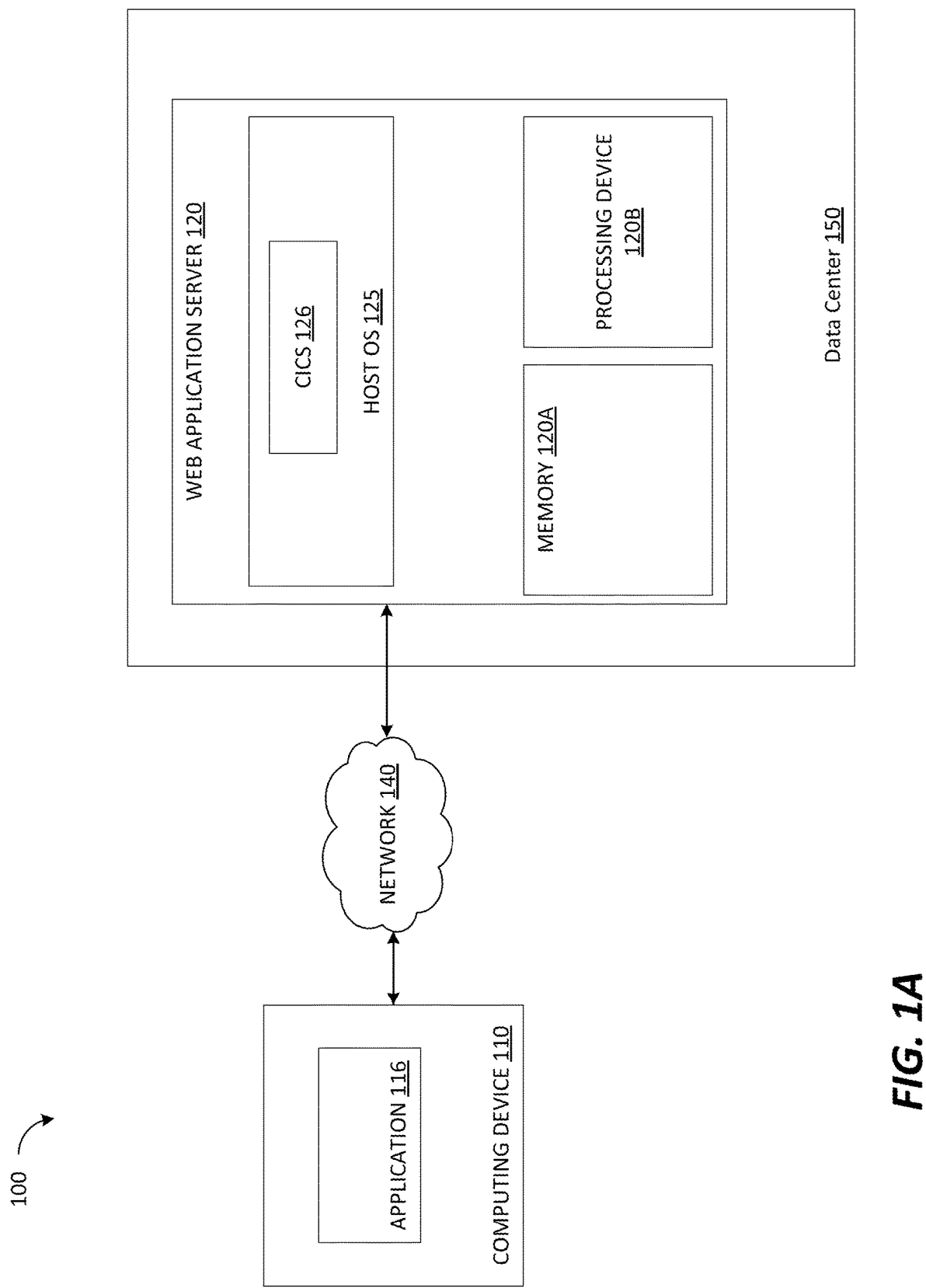
FIG. 1A is a block diagram that illustrates an example system, in accordance with some embodiments of the present disclosure.

FIG. 1A is a block diagram that illustrates an example system 100. As illustrated in FIG. 1, the system 100 includes computing device 110 and a data center 150 comprising database servers 130A-130N and a web application server 120. The computing device 110 and the data center 150 may be coupled to each other (e.g., may be operatively coupled, communicatively coupled, may communicate data/messages with each other) via network 140. Network 140 may be a public network (e.g., the internet), a private network (e.g., a local area network (LAN) or wide area network (WAN)), or a combination thereof. In one embodiment, network 140 may include a wired or a wireless infrastructure, which may be provided by one or more wireless communications systems, such as a WiFi™ hotspot connected with the network 140 and/or a wireless carrier system that can be implemented using various data processing equipment, communication towers (e.g. cell towers), etc. The network 140 may carry communications (e.g., data, message, packets, frames, etc.) between computing device 110 and the database servers 130 of the data center 150. The computing device 110, database servers 130, and the web application server 120 may each include hardware such as processing device 120B (e.g., processors, central processing units (CPUs)), memory 120A (e.g., random access memory (RAM), storage devices (e.g., hard-disk drive (HDD)), and solid-state drives (SSD), etc.), and other hardware devices (e.g., sound card, video card, etc.). A storage device may comprise a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices. The database servers 130 may comprise one or more storage devices (e.g., hard-disk drive (HDD), and solid-state drives (SSD), etc.) for storing data and executing web applications (not shown).

FIG. 1A and the other figures may use like reference numerals to identify like elements. A letter after a reference numeral, such as "110A," indicates that the text refers specifically to the element having that particular reference numeral. A reference numeral in the text without a following letter, such as "110," refers to any or all of the elements in the figures bearing that reference numeral.

The computing device 110, database servers 130, and the web application server 120 may each comprise any suitable type of computing device or machine that has a programmable processor including, for example, server computers, desktop computers, laptop computers, tablet computers, smartphones, set-top boxes, etc. In some examples, the computing device 110, database servers 130, and the web application server 120 may each comprise a single machine or may include multiple interconnected machines (e.g., multiple servers configured in a cluster). The computing device 110, database servers 130, and the web application server 120 may be implemented by a common entity/organization or may be implemented by different entities/organizations. For example, computing device 110 may be operated by a first company/corporation and database servers 130 and web application server 120 may be operated by a second company/corporation. The computing device 110, database servers 130, and the web application server 120 may each execute or include an operating system (OS). The OSs of computing device 110, database servers 130, and the web application server 120 may manage the execution of other components (e.g., software, applications, etc.) and/or may manage access to the hardware (e.g., processors, memory, storage devices etc.) of the computing device.

As illustrated in FIG. 1A, computing device 110 may run an application 116 which may allow a user to interact with data center 150. When the user wants to access the data center 150, they may utilize application 116 (which may be e.g., a client w/ a graphical user interface (GUI)) to connect to a specific database server 130 of the data center 150 via the web application server 120. The application 116 may interact with the web application server 120 which may run a host OS 125 that executes a CICS transaction processing and management system 126 (hereinafter referred to as CICS 126) that may analyze requests by the application 116 to e.g., run an online application (as discussed herein). A task control block (TCB) represents a host OS 125 task which comprises a dispatchable unit of work of the host OS 125. As discussed hereinabove, a CICS region is an address space of host OS 125 and may contain multiple TCBs (and hence multiple tasks of the host OS 125). Within a CICS region, a CICS task itself may run on a TCB. In some embodiments, a single TCB known as the quasi-reentrant TCB (QR TCB) is used by the CICS 126 to run all user applications.

Figure 1B:
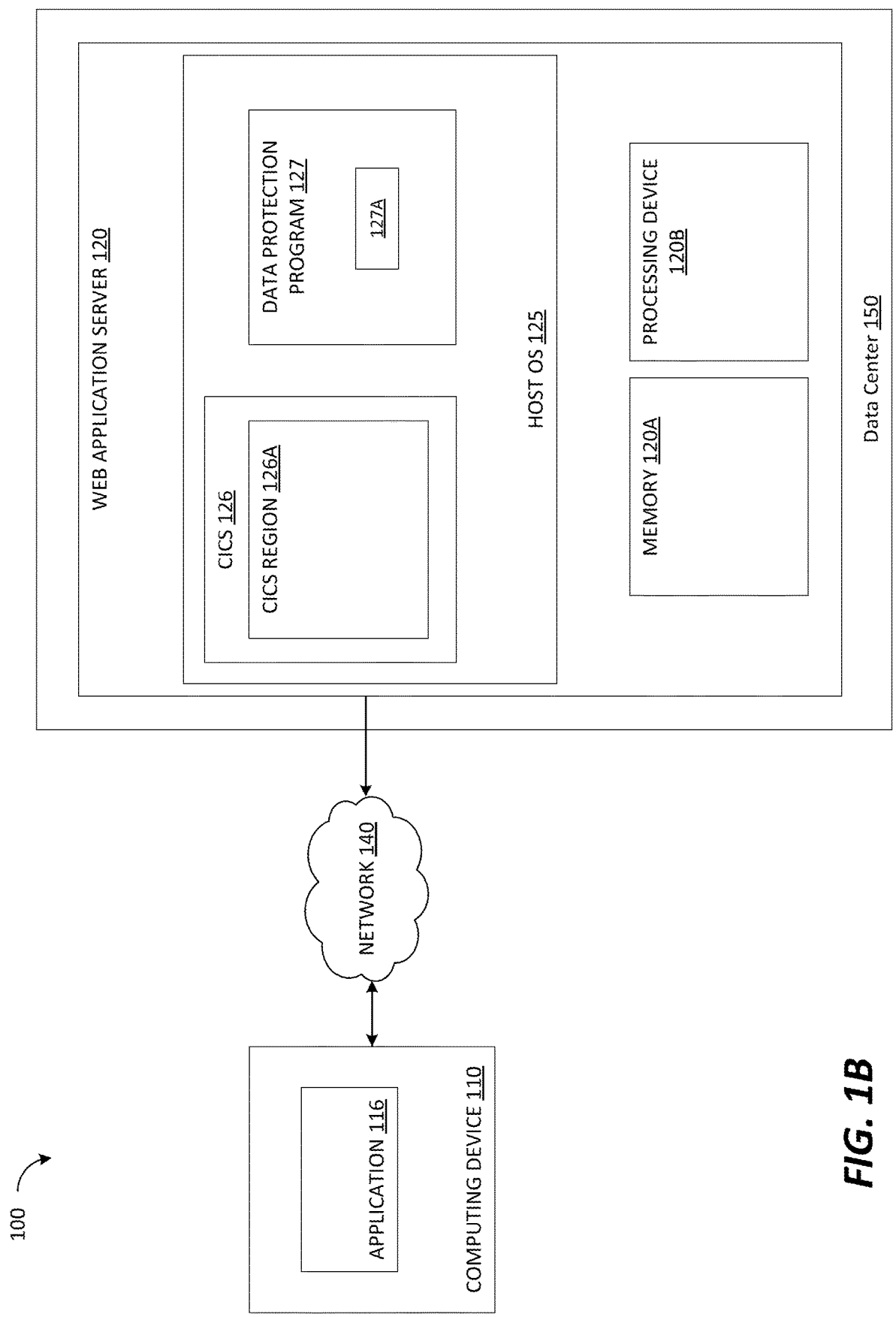
FIG. 1B is a block diagram that illustrates an example system for implementing a CICS transaction processing system and a data protection program, in accordance with some embodiments of the present disclosure.

As shown in FIG. 1B, the host OS 125 may further execute a data protection program 127 which the user wishes to install and deploy within a CICS region 126A. Although described with respect to a data protection program 127, the program that the user wishes to install and deploy may be any appropriate program. The data protection program 127 may include a program launching module 127A which may be executed by processing device 120B to perform some of the functionality described herein.

Figure 2:
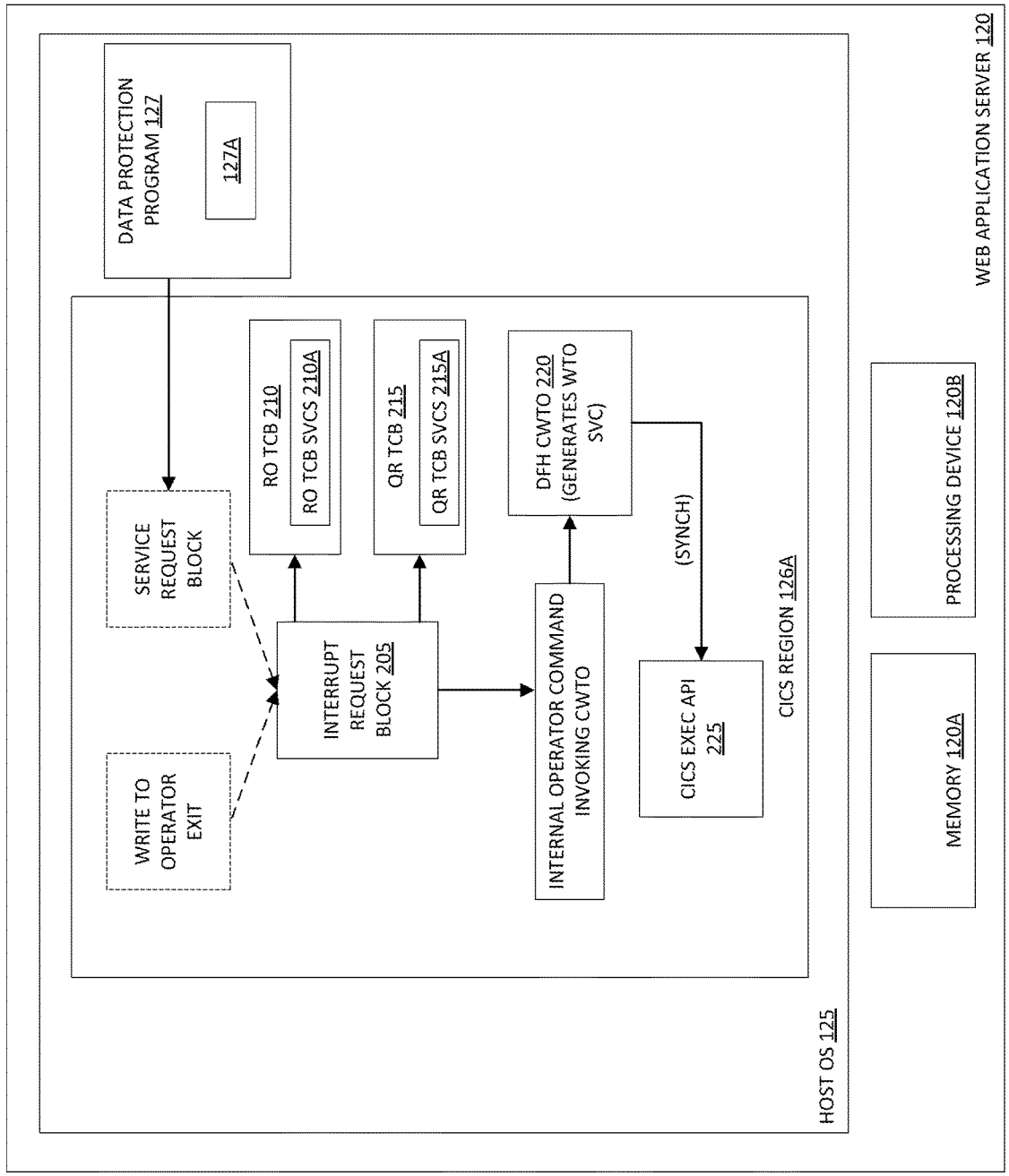
FIG. 2 is a block diagram that illustrates a detailed example system for installing a data protection program within a CICS region without an antecedent program, in accordance with some embodiments of the present disclosure.

Referring now to FIG. 2, the processing device 120B (executing the program launching module 127A) may monitor for an initiating event, in response to which the processing device 120B may prepare the CICS region 126A to intercept and execute API calls being made to install the data protection program 127, as discussed in further detail herein. FIG. 2 illustrates two examples of initiating events. In one example the initiating event may be internally driven, and thus may comprise an exit that is driven by the issuance of a message by the CICS region 126A to an operator console of the host OS 125 using e.g., the write operator. An operator console may enable a user to receive and view messages for the host OS 125 and enter commands to the host OS 125 (e.g., to activate one or more services of the host OS 125 as discussed in further detail herein). The write operator may be a service of the host OS 125 that enables an application to write a message to any of the operator consoles of the host OS 125 and, if required, wait for a reply. An exit may refer to a modification of the function of a service of the host OS 125. When an exit is invoked, the host OS 125 passes control to an exit routine which may comprise a custom routine that may perform certain processing. At the end of the custom routine, control returns to a specified point in the code of the host OS 125.

The initiating event may comprise an exit driven by the issuance of any appropriate message by the CICS region 126A to an operator console of the host OS 125. For example, the initiating event may comprise an exit driven by the issuance of a message indicating that control has been given to the CICS region 126A and that it is ready to process transactions (e.g., the DFH SI1517 message). The program launching module 127A may register with the host OS 125, a message exit with the functionality to schedule an interrupt request block (IRB) that will prepare the CICS region 126A to intercept and execute API calls being made to install the data protection program 127. The program launching module 127A may register the exit with the host OS 125 as being associated with the DFH SI1517 message (or whichever message the exit will trigger on) and upon issuance of the triggering message, the host OS 125 may call the exit. In turn, the exit may schedule an IRB as discussed in further detail below.

In another example, the initiating event may be externally driven, and thus may comprise the scheduling of a service request block (SRB) by a foreign address space (in the example of FIG. 2, the foreign address space may correspond to the data protection program 127). An SRB is a type of control block that represents a routine that performs a particular function or service in a specified address space and may be similar to a TCB insofar as it identifies a unit of work in the host OS 125 (i.e., a dispatchable work unit that executes on behalf of a requesting user). This example of an initiating event may be utilized in situations where the CICS region 126A is brought up in the host OS 125 first before the data protection program 127, and thus any message will not be seen and the data protection program 127 must initiate the process itself. The SRB (similarly to the message exit) may schedule an IRB that will prepare the CICS region 126A to intercept and execute API calls being made to install the data protection program 127.

The CICS region 126A may include a resource owning TCB (hereinafter referred to and shown in FIG. 2 as RO TCB 210) and a quasi-reentrant TCB (hereinafter referred to and shown in FIG. 2 as QR TCB 215). The RO TCB 210 may represent a logical unit of work within the CICS region 126A and may function to issue supervisor calls to the build and load services (not shown in the FIGS.) of the host OS 125. The QR TCB 215 may represent a logical unit of work within the CICS region 126A that may function to issue supervisor calls to the write-to-operator service (not shown in the FIGS.) of the host OS 125.

In response to occurrence of an initiating event, the processing device 120B may schedule an interrupt request block (hereinafter referred to and shown in FIG. 2 as 205) within the CICS region 126A. The IRB 205 may provide a dispatchable unit of work that is similar to the unit of work provided by a TCB, but that preempts the execution of other request blocks. More specifically, the IRB 205 may include a certain privilege set that allows it to jump to the head of the line with respect to other request blocks that are waiting to be scheduled for execution. Once the IRB 205 receives control from the scheduler (not shown in the FIGS.) of the host OS 125 (i.e., is scheduled for execution), it may create a supervisor call screen (SVCS) for each of the TCBs 210 and 215. An SVCS may intercept the supervisor calls made by a TCB. A supervisor call may be a special machine instruction that is used to communicate with the host OS 125. The supervisor call passes a parameter list to the host OS 125 to tell it what service the calling program is requesting. The IRB 205 may create an SVCS 210A to intercept supervisor calls made by the RO TCB 210 and an SVCS 215A to intercept supervisor calls made by the QR TCB 215. At this point, the CICS region 126 may be prepared to intercept and execute calls being made by the data protection program 127, as discussed in further detail herein.

The IRB 205 may issue an internal operator command to the CICS region 126A to run the CWTO command. More specifically, the IRB 205 may issue an internal operator command to the CICS region 126A to run a transaction and specify CWTO as the transaction ID in order to invoke the CWTO command. The CWTO command may be used to send messages to the console operator via the write-to-operator service (DFH CWTO) as shown in FIG. 2 and may be initiated by e.g., specifying "CWTO," optionally followed by the text of the message desired to be sent (e.g., on a command line) in the internal operator command. The DFH CWTO is a CICS-supplied transaction that allows an operator to send a message to a console operator. The IRB 205 may initiate the CWTO command and specify the text of the message to be any arbitrary string of characters. The CWTO command may invoke the console write-to-operator module (DFH CWTO) which may format the specified text of the CWTO message into a WTO message and issue a WTO supervisor call comprising the WTO message for proximate intercept by the SVCS 215A of the QR TCB 215. In some embodiments, instead of specifying a string of arbitrary characters the IRB 205 may utilize the text of the message desired to be sent to invoke certain options or pass certain arguments to the data protection program 127 (i.e., the program being installed in the CICS region 126A).

When the SVCS 215A intercepts the WTO message, control is passed from the SVCS 215A (i.e., the host OS 125) to the CICS execution API 225 from the SVCS 215A via a mechanism that allows program execution to pass from a supervisor state (privileged state) to a problem state (e.g., the Synch mechanism of the z/OS), thereby preventing the program execution from causing any damage to the CICS region 126A (since it is not executing in the supervisor state). As the CICS execution API 225 begins working on the CWTO command, it may also (based on instructions from the program launching module 127A) begin issuing API calls relevant to the execution of the data protection program 127 into the CICS execution API 225. The API calls relevant to the execution of the data protection program 127 may include an API call for a CSD define program, an API call for a CSD install program, and an API call for a load program. The CICS execution API 225 works on/execute these API calls as if they were a continuation of the preceding program (in this case, the CWTO command). Indeed, the CWTO command is initiated with an arbitrary string of characters as the message to be displayed on the operator's console because the CWTO command's primary function in this case is as a vehicle on which the API calls relevant to the execution of the data protection program can be "piggybacked," and the message to be displayed on the operator console is not important. In this way, embodiments of the present disclosure circumvent the need for a separate antecedent program when installing the data protection program 127 at an arbitrary point in time without manual intervention or cycling of the CICS region 126A.

This circuitous execution of the CICS execution API 225, via the SVCS 215A, is the crucial step in transitioning from the host OS 125's external code-path to the CICS region 126A's internal code-path. When the CICS execution API 225 makes the define program API call, a build service supervisor call is intercepted by the RO SVCS 210A screen and returns program attribute information as if the new program were found within the private library. When the CICS execution API 225 makes the load program API call, the directed load supervisor call is intercepted by the RO SVCS 210A and the new program is relocated from common memory rather than from the private library. Once all API calls relevant to the execution of the data protection program 127 are completed, then return control back to CICS region 126A via the SVCS 215A.

Figure 3:
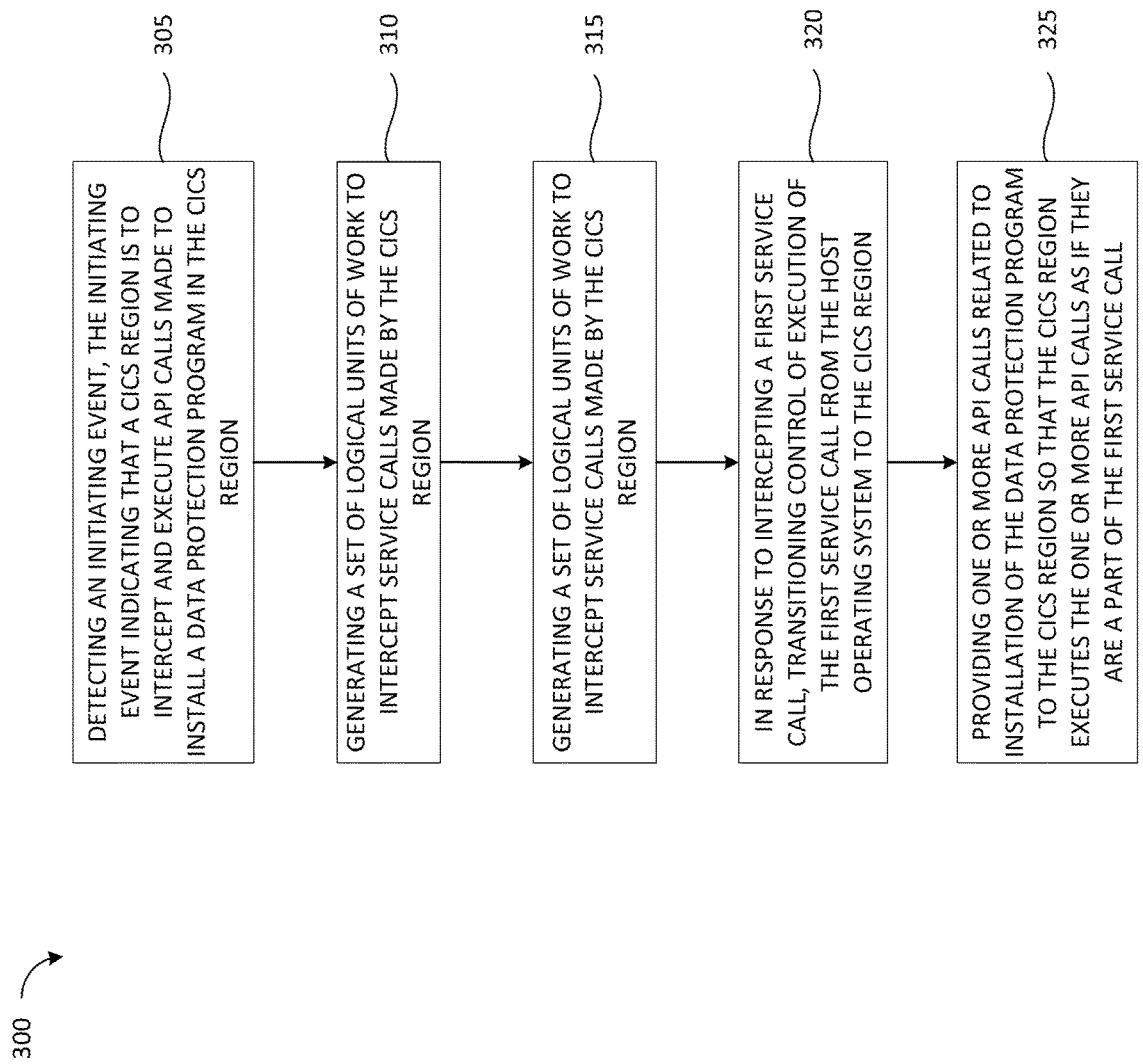
FIG. 3 is a flow diagram of a method of installing a program within a CICS region without an antecedent program, in accordance with some embodiments of the present disclosure.

FIG. 3 is a flow diagram of a method 300 for installing a program within a CICS region without an antecedent program, in accordance with some embodiments of the present disclosure. Method 300 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 300 may be performed by a computing device (e.g., web application server 120 (via processing device 120B) illustrated in FIG. 2).

At block 305, the processing device 120B may detect an initiating event, the initiating event indicating that a CICS region is to intercept and execute API calls made to install a data protection program in the CICS region. At block 310, in response to occurrence of an initiating event, the processing device 120B may schedule an interrupt request block (hereinafter referred to and shown in FIG. 2 as IRB 205) within the CICS region 126A. The IRB 205 may provide a dispatchable unit of work that is similar to the unit of work provided by a TCB, but that preempts the execution of other request blocks. More specifically, the IRB 205 may include a certain privilege set that allows it to jump to the head of the line with respect to other request blocks that are waiting to be scheduled for execution. Once the IRB 205 receives control from the scheduler (not shown in the FIGS.) of the host OS 125 (i.e., is scheduled for execution), it may create a supervisor call screen (SVCS) for each of the TCBs 210 and 215. An SVCS may intercept the supervisor calls made by a TCB. A supervisor call may be a special machine instruction that is used to communicate with the host OS 125. The supervisor call passes a parameter list to the host OS 125 to tell it what service the calling program is requesting. The IRB 205 may create an SVCS 210A to intercept supervisor calls made by the RO TCB 210 and an SVCS 215A to intercept supervisor calls made by the QR TCB 215. At this point, the CICS region 126 may be prepared to intercept and execute calls being made by the data protection program 127, as discussed in further detail herein.

At block 315, the IRB 205 may issue an internal operator command to the CICS region 126A to run the CWTO command. More specifically, the IRB 205 may issue an internal operator command to the CICS region 126A to run a transaction and specify CWTO as the transaction ID in order to invoke the CWTO command. The CWTO command may be used to send messages to the console operator via the write-to-operator service (DFH CWTO) as shown in FIG. 2 and may be initiated by e.g., specifying "CWTO," optionally followed by the text of the message desired to be sent (e.g., on a command line) in the internal operator command. The DFH CWTO is a CICS-supplied transaction that allows an operator to send a message to a console operator. The IRB 205 may initiate the CWTO command and specify the text of the message to be any arbitrary string of characters. The CWTO command may invoke the console write-to-operator module (DFH CWTO) which may format the specified text of the CWTO message into a WTO message and issue a WTO supervisor call comprising the WTO message for proximate intercept by the SVCS 215A of the QR TCB 215. In some embodiments, instead of specifying a string of arbitrary characters the IRB 205 may utilize the text of the message desired to be sent to invoke certain options or pass certain arguments to the data protection program 127 (i.e., the program being installed in the CICS region 126A).

At block 320, when the SVCS 215A intercepts the WTO message, control is passed from the SVCS 215A (i.e., the host OS 125) to the CICS execution API 225 from the SVCS 215A via a mechanism that allows program execution to pass from a supervisor state (privileged state) to a problem state (e.g., the Synch mechanism of the z/OS), thereby preventing the program execution from causing any damage to the CICS region 126A (since it is not executing in the supervisor state). At block 325, as the CICS execution API 225 begins working on the CWTO command, it may also (based on instructions from the program launching module 127A) begin issuing API calls relevant to the execution of the data protection program 127 into the CICS execution API 225. The API calls relevant to the execution of the data protection program 127 may include an API call for a CSD define program, an API call for a CSD install program, and an API call for a load program. The CICS execution API 225 works on/execute these API calls as if they were a continuation of the preceding program (in this case, the CWTO command). Indeed, the CWTO command is initiated with an arbitrary string of characters as the message to be displayed on the operator's console because the CWTO command's primary function in this case is as a vehicle on which the API calls relevant to the execution of the data protection program can be "piggybacked," and the message to be displayed on the operator console is not important. In this way, embodiments of the present disclosure circumvent the need for a separate antecedent program when installing the data protection program 127 at an arbitrary point in time without manual intervention or cycling of the CICS region 126A.

This circuitous execution of the CICS execution API 225, via the SVCS 215A, is the crucial step in transitioning from the host OS 125's external code-path to the CICS region 126A's internal code-path. When the CICS execution API 225 makes the define program API call, a build service supervisor call is intercepted by the RO SVCS 210A screen and returns program attribute information as if the new program were found within the private library. When the CICS execution API 225 makes the load program API call, the directed load supervisor call is intercepted by the RO SVCS 210A and the new program is relocated from common memory rather than from the private library. Once all API calls relevant to the execution of the data protection program 127 are completed, then return control back to CICS region 126A via the SVCS 215A.

Figure 4:
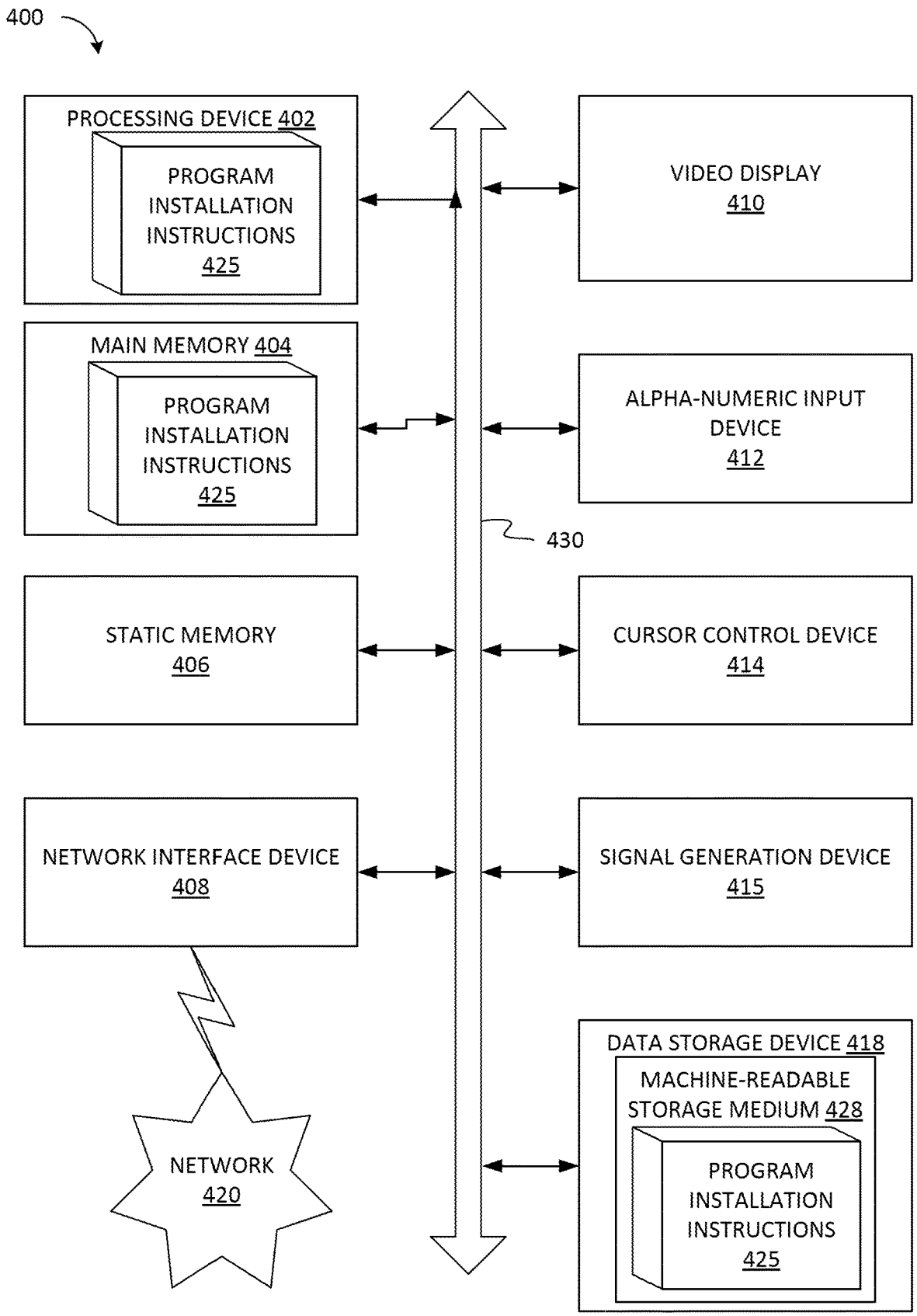
FIG. 4 is a block diagram of an example computing device that may perform one or more of the operations described herein, in accordance with some embodiments of the present disclosure.

FIG. 4 illustrates a diagrammatic representation of a machine in the example form of a computer system 400 within which a set of instructions, for causing the machine to perform any one or more of the methodologies discussed herein for generating a high level security policy.

In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 400 may be representative of a server.

The example computer system 400 includes a processing device 402, a main memory 404 (e.g., read-only memory (ROM), flash memory, dynamic random access memory (DRAM), a static memory 406 (e.g., flash memory, static random access memory (SRAM), etc.), and a data storage device 418, which communicate with each other via a bus 430. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Computing device 400 may further include a network interface device 408 which may communicate with a network 420. The computing device 400 also may include a video display unit 410 (e.g., a liquid crystal display (LCD) or a cathode ray tube (CRT)), an alphanumeric input device 412 (e.g., a keyboard), a cursor control device 414 (e.g., a mouse) and an acoustic signal generation device 416 (e.g., a speaker). In one embodiment, video display unit 410, alphanumeric input device 412 and cursor control device 414 may be combined into a single component or device (e.g., an LCD touch screen).

Processing device 402 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute program installation instructions 425 for performing the operations and steps discussed herein.

The data storage device 415 may include a machine-readable storage medium 428, on which is stored one or more sets of program installation instructions 425 (e.g., software) embodying any one or more of the methodologies of functions described herein. The program installation instructions 425 may also reside, completely or at least partially, within the main memory 404 or within the processing device 402 during execution thereof by the computer system 400; the main memory 404 and the processing device 402 also constituting machine-readable storage media. The program installation instructions 425 may further be transmitted or received over a network 420 via the network interface device 408.

The machine-readable storage medium 428 may also be used to store instructions to perform a method for generating a high level security policy, as described herein. While the machine-readable storage medium 428 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

It will be appreciated that variants of the above-disclosed and other features and functions, or alternatives thereof, may be combined into may other different systems or applications. Various presently unforeseen or unanticipated alternatives, modifications, variations, or improvements therein may be subsequently made by those skilled in the art which are also intended to be encompassed by the following claims. The claims may encompass embodiments in hardware, software, or a combination thereof.

What is claimed is:

1. A method comprising:
    detecting by a customer information control system (CICS) region in which a program is to be installed, an initiating event, wherein the CICS region executes logical units of work that each corresponds to a task of a host operating system (OS);
    generating, via the initiating event, a first logical unit of work to intercept service calls made by the CICS region;
    in response to the first logical unit of work intercepting a first service call, transitioning by a processing device, control of execution of the first service call from the host OS to a CICS execution application program interface (API); and
    issuing, by the CICS execution API, one or more API calls related to installation of the program, wherein the CICS execution API executes the one or more API calls as if they are part of the first service call.

2. The method of claim 1, wherein the first logical unit of work comprises an interrupt request block (IRB) that preempts execution of other logical units of work of a plurality of logical units of work, and wherein to intercept the first service call, the IRB creates a supervisor call screen (SVCS) for a second logical unit of work.

3. The method of claim 2, wherein transitioning control of execution of the first service call comprises:
    transitioning control from the SVCS to the CICS execution API via a mechanism that shifts execution of the first service call from a supervisor state to a problem state.

4. The method of claim 1, further comprising:
    generating the first service call using a second logical unit of work, wherein generating the first service call comprises:
    creating, by an IRB, a message to a console operator of the host OS; and
    formatting the message into the first service call.

5. The method of claim 4, wherein the IRB includes in the message to the console operator, one or more of:
    selection of one or more options for the program; and
    one or more arguments to pass to the program.

6. The method of claim 1, wherein the initiating event comprises:
    a scheduling of a service request block (SRB) by a foreign address space corresponding to the program.

7. The method of claim 1, wherein the initiating event comprises:
    an internally driven exit that is responsive to issuance of a message by the CICS region to an operator console of the host OS.

8. A system comprising:
    a memory; and
    a processing device, operatively coupled to the memory, the processing device configured to:
    detect by a customer information control system (CICS) region in which a program is to be installed, an initiating event, wherein the CICS region executes logical units of work that each corresponds to a task of a host operating system (OS);
    generate, via the initiating event, a first logical unit of work to intercept service calls made by the CICS region;
    in response to the first logical unit of work intercepting a first service call, transition control of execution of the first service call from the host OS to a CICS execution application program interface (API); and
    issue, by the CICS execution API, one or more API calls related to installation of the program, wherein the CICS execution API executes the one or more API calls as if they are part of the first service call.

9. The system of claim 8, wherein the first logical unit of work comprises an interrupt request block (IRB) that preempts execution of other logical units of work of a plurality of logical units of work, and wherein to intercept the first service call, the processing device creates, via the IRB, a supervisor call screen (SVCS) for a second logical unit of work.

10. The system of claim 9, wherein to transition control of execution of the first service call, the processing device is further configured to:
    transition control from the SVCS to the CICS execution API via a mechanism that shifts execution of the first service call from a supervisor state to a problem state.

11. The system of claim 8, wherein the processing device is further configured to:
    generate the first service call using a second logical unit of work, and wherein to generate the first service call the processing device is to:
    create, by an IRB, a message to a console operator of the host OS; and format the message into the first service call.

12. The system of claim 11, wherein the IRB includes in the message to the console operator, one or more of:
    selection of one or more options for the program; and
    one or more arguments to pass to the program.

13. The system of claim 8, wherein the initiating event comprises:
    a scheduling of a service request block (SRB) by a foreign address space corresponding to the program.

14. The system of claim 8, wherein the initiating event comprises:
    an internally driven exit that is responsive to issuance of a message by the CICS region to an operator console of the host OS.

15. A non-transitory computer-readable medium having instructions stored thereon which, when executed by a processing device, cause the processing device to:
- detect by a customer information control system (CICS) region in which a program is to be installed, an initiating event, wherein the CICS region executes logical units of work that each corresponds to a task of a host operating system (OS);
- generate, via the initiating event, a first logical unit of work to intercept service calls made by the CICS region;
- in response to the first logical unit of work intercepting a first service call, transition by the processing device, control of execution of the first service call from the host OS to a CICS execution application program interface (API); and
- issue, by the CICS execution API, one or more API calls related to installation of the program, wherein the CICS execution API executes the one or more API calls as if they are part of the first service call.

16. The non-transitory computer-readable medium of claim 15, wherein the first logical unit of work comprises an interrupt request block (IRB) that preempts execution of other logical units of work of a plurality of logical units of work, and wherein to intercept the first service call, the processing device creates, via the IRB, a supervisor call screen (SVCS) for a second logical unit of work.

17. The non-transitory computer-readable medium of claim 16, wherein to transition control of execution of the first service call, the processing device is to:
- transition control from the SVCS to the CICS execution API via a mechanism that shifts execution of the first service call from a supervisor state to a problem state.

18. The non-transitory computer-readable medium of claim 15, wherein the processing device is further to: generate the first service call using a second logical unit of work, and wherein to generate the first service call the processing device is to: create, by an IRB, a message to a console operator of the host OS; and format the message into the first service call.

19. The non-transitory computer-readable medium of claim 18, wherein the IRB includes in the message to the console operator, one or more of:
- selection of one or more options for the program; and
- one or more arguments to pass to the program.

20. The non-transitory computer-readable medium of claim 15, wherein the initiating event comprises:
- a scheduling of a service request block (SRB) by a foreign address space corresponding to the program.

* * * * *